US012137376B2

(12) United States Patent
Murakami et al.

(10) Patent No.: US 12,137,376 B2
(45) Date of Patent: Nov. 5, 2024

(54) WIRELESS RELAY DEVICE, GATEWAY DEVICE, AND MULTI-HOP NETWORK SYSTEM

(71) Applicant: KABUSHIKI KAISHA TOSHIBA, Tokyo (JP)

(72) Inventors: Takaomi Murakami, Kamakura Kanagawa (JP); Miyuki Ogura, Tokyo (JP); Tatsuma Hirano, Kawasaki Kanagawa (JP); Toshihisa Nabetani, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 301 days.

(21) Appl. No.: 17/686,000

(22) Filed: Mar. 3, 2022

(65) Prior Publication Data

US 2023/0083380 A1   Mar. 16, 2023

(30) Foreign Application Priority Data

Sep. 14, 2021   (JP) .................................. 2021-149335

(51) Int. Cl.
*H04W 28/18* (2009.01)
*H04W 28/24* (2009.01)
*H04W 68/06* (2009.01)

(52) U.S. Cl.
CPC ........... *H04W 28/18* (2013.01); *H04W 28/24* (2013.01); *H04W 68/06* (2013.01)

(58) Field of Classification Search
CPC ..... H04W 28/18; H04W 28/24; H04W 68/06; H04W 28/0215; H04W 40/22;
(Continued)

(56) References Cited

U.S. PATENT DOCUMENTS 6,185,215 B1 * 2/2001 Aho .................... H04Q 11/0478
                                                    370/402
7,007,100 B1 * 2/2006 Doong .................... H04L 45/00
                                                    709/245

(Continued)

FOREIGN PATENT DOCUMENTS

JP   2016220102 A   12/2016
JP   2020088574 A   6/2020
JP   2020088820 A   6/2020

OTHER PUBLICATIONS

Thubert et al., "Routing for RPL Leaves", ROLL, Internet-Draft, available online at: https:/Aools.ietf. org/html/draft-thubert-roll-unaware-leaves-06, Nov. 17, 2019 (Year: 2019).*

(Continued)

*Primary Examiner* — Ayaz R Sheikh
*Assistant Examiner* — Tarell A Hampton
(74) *Attorney, Agent, or Firm* — Holtz, Holtz & Volek PC (57) ABSTRACT

In a multi-hop network including a wireless relay device and a gateway device, the wireless relay device includes a determination unit which determines whether a wireless device connected to the wireless relay device supports a routing protocol of the multi-hop network, and a notification unit which notifies the gateway device or another wireless relay device in the multi-hop network of information for identifying the wireless device when the determination unit determines that the wireless device does not support the routing protocol.

16 Claims, 10 Drawing Sheets

(58) Field of Classification Search
CPC ............. H04W 40/246; H04W 40/248; H04B 7/15528; Y02D 30/70
See application file for complete search history.

(56) References Cited

U.S. PATENT DOCUMENTS

| | | | | |
|---|---|---|---|---|
| 7,177,646 | B2* | 2/2007 | O'Neill | H04L 45/22 455/442 |
| 7,447,188 | B1* | 11/2008 | Dommety | H04W 60/00 370/392 |
| 2002/0172203 | A1* | 11/2002 | Ji | G06F 16/902 370/395.31 |
| 2003/0021232 | A1* | 1/2003 | Duplaix | H04L 63/0227 370/469 |
| 2003/0067914 | A1* | 4/2003 | Kim | H04L 12/2874 370/395.5 |
| 2004/0001497 | A1* | 1/2004 | Sharma | H04L 45/02 709/238 |
| 2009/0028121 | A1* | 1/2009 | Kinoshita | H04L 45/66 370/338 |
| 2012/0155463 | A1* | 6/2012 | Vasseur | H04L 67/145 370/390 |
| 2012/0155475 | A1* | 6/2012 | Vasseur | H04L 12/56 370/400 |
| 2013/0088999 | A1* | 4/2013 | Thubert | H04L 45/02 370/254 |
| 2015/0373735 | A1* | 12/2015 | Thubert | H04W 4/90 370/310.1 |
| 2016/0043942 | A1* | 2/2016 | Purohit | H04W 40/244 370/338 |
| 2016/0330107 | A1* | 11/2016 | Thubert | H04L 45/74 |
| 2017/0034041 | A1* | 2/2017 | Carofiglio | H04L 45/122 |
| 2017/0273002 | A1* | 9/2017 | Chen | H04W 40/246 |
| 2018/0183701 | A1* | 6/2018 | Qi | H04W 40/244 |
| 2018/0294983 | A1* | 10/2018 | Mani | H04L 61/4511 |
| 2019/0004587 | A1* | 1/2019 | Van Wyk | H04W 88/182 |
| 2019/0014436 | A1* | 1/2019 | Radmand | H04W 4/80 |
| 2020/0169314 | A1 | 5/2020 | Ogura | |
| 2020/0178152 | A1 | 6/2020 | Adachi et al. | |
| 2020/0314005 | A1* | 10/2020 | Hanley | H04W 40/246 |
| 2021/0258855 | A1* | 8/2021 | Bartell | H04L 45/02 |
| 2021/0314290 | A1* | 10/2021 | Thubert | H04L 61/5069 |
| 2022/0053405 | A1* | 2/2022 | Wang | H04W 40/16 |

OTHER PUBLICATIONS

Murakami, et al., "A MAC Layers Bundling Technique for Multi-hop WLAN Networks", 2020 IEICE Society Conference (B-5-73), 2020, p. 273.

Japanese Decision to Grant a Patent (and its English translation thereof) dated Jul. 9, 2024, issued in counterpart Japanese Application No. 2021-149335.

* cited by examiner

| IP address | MAC address | State |
|---|---|---|
| 192.168.0.1 | 12:34:56:78:90:01 | REACHABLE |
| 192.168.0.2 | 12:34:56:78:90:02 | FAILED |

FIG. 4

| IPv6 address | MAC address | State |
|---|---|---|
| fe80::1 | 12:34:56:78:90:01 | DELAY |
| fe80::2 | 12:34:56:78:90:02 | STALE |

| Wireless device | Wireless relay device |
|---|---|
| 2001::14 | 2001::18d |
| 2001::a | 2001::b |

FIG. 7

| Device | Next hop |
|---|---|
| Wireless relay device 18a | Gateway device 16 |
| Wireless relay device 18b | Wireless relay device 18a |
| Wireless relay device 18c | Wireless relay device 18b |

FIG. 8

| Device | Next hop |
|---|---|
| Wireless device 14 | Wireless relay device 18d |

FIG. 9

| Device | Next hop |
|---|---|
| Wireless relay device 18a | Gateway device 16 |
| Wireless relay device 18b | Wireless relay device 18a |
| Wireless relay device 18c | Wireless relay device 18b |
| Wireless device 14 | Wireless relay device 18d |

| Device | Next hop |
|---|---|
| Wireless relay device 18a | Gateway device 16 |
| Wireless relay device 18b | Wireless relay device 18a |
| Wireless relay device 18c | Wireless relay device 18a |
| Wireless relay device 18d | Wireless relay device 18b |
| Wireless relay device 18e | Wireless relay device 18b |
| Wireless relay device 18f | Gateway device 16 |

FIG. 13

| Device | Next hop |
|---|---|
| Wireless relay device 18c | Wireless relay device 18b |

FIG. 14

| Device | Next hop |
|---|---|
| Wireless relay device 18a | Gateway device 16 |
| Wireless relay device 18b | Wireless relay device 18a |
| Wireless relay device 18c | Wireless relay device 18b |
| Wireless relay device 18d | Wireless relay device 18b |
| Wireless relay device 18e | Wireless relay device 18b |
| Wireless relay device 18f | Gateway device 16 |

FIG. 15

| Device | Next hop |
|---|---|
| Wireless device "A" | Wireless relay device "B" |

FIG. 16

| Device | Next hop |
|---|---|
| Wireless device 14 | Wireless relay device 18d |

FIG. 17

| Device | Next hop |
|---|---|
| Wireless device "A" | Wireless relay device "B" |
| Wireless device 14 | Wireless relay device 18d |

FIG. 18

| Next header | Length | Type | Segments left |
|---|---|---|---|
| (Reserved) ||||
| Wireless relay device 18a ||||
| Wireless relay device 18b ||||
| Wireless relay device 18d ||||
| Wireless device 14 ||||

WIRELESS RELAY DEVICE, GATEWAY DEVICE, AND MULTI-HOP NETWORK SYSTEM

CROSS-REFERENCE TO RELATED APPLICATIONS

This application is based upon and claims the benefit of priority from Japanese Patent Application No. 2021-149335, filed Sep. 14, 2021, the entire contents of which are incorporated herein by reference.

FIELD

Embodiments described herein relate generally to a wireless relay device, gateway device, and multi-hop network system.

BACKGROUND

IPV6 Routing Protocol for Low-power and Lossy Networks (RPL) is known as a routing protocol of a wireless multi-hop network. In the RPL, a gateway device manages network information. A wireless relay device can execute routing on a link with another wireless relay device using the RPL to construct the multi-hop network.

When a wireless device that does not support a routing protocol is connected to a wireless relay device supporting the routing protocol, it is difficult for the wireless relay device to obtain route information with the wireless device and transmit the route information to another wireless relay device. Therefore, it is difficult for the wireless relay device to execute routing on a link with the other wireless relay device, and construct a multi-hop network.

DETAILED DESCRIPTION

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a wireless relay device, in a multi-hop network including at least a gateway device, comprises a determination unit configured to determine whether a wireless device connected to the wireless relay device supports a routing protocol of the multi-hop network, and a notification unit configured to notify the gateway device or another wireless relay device in the multi-hop network of information for identifying the wireless device when the determination unit determines that the wireless device does not support the routing protocol.

Figure 1:
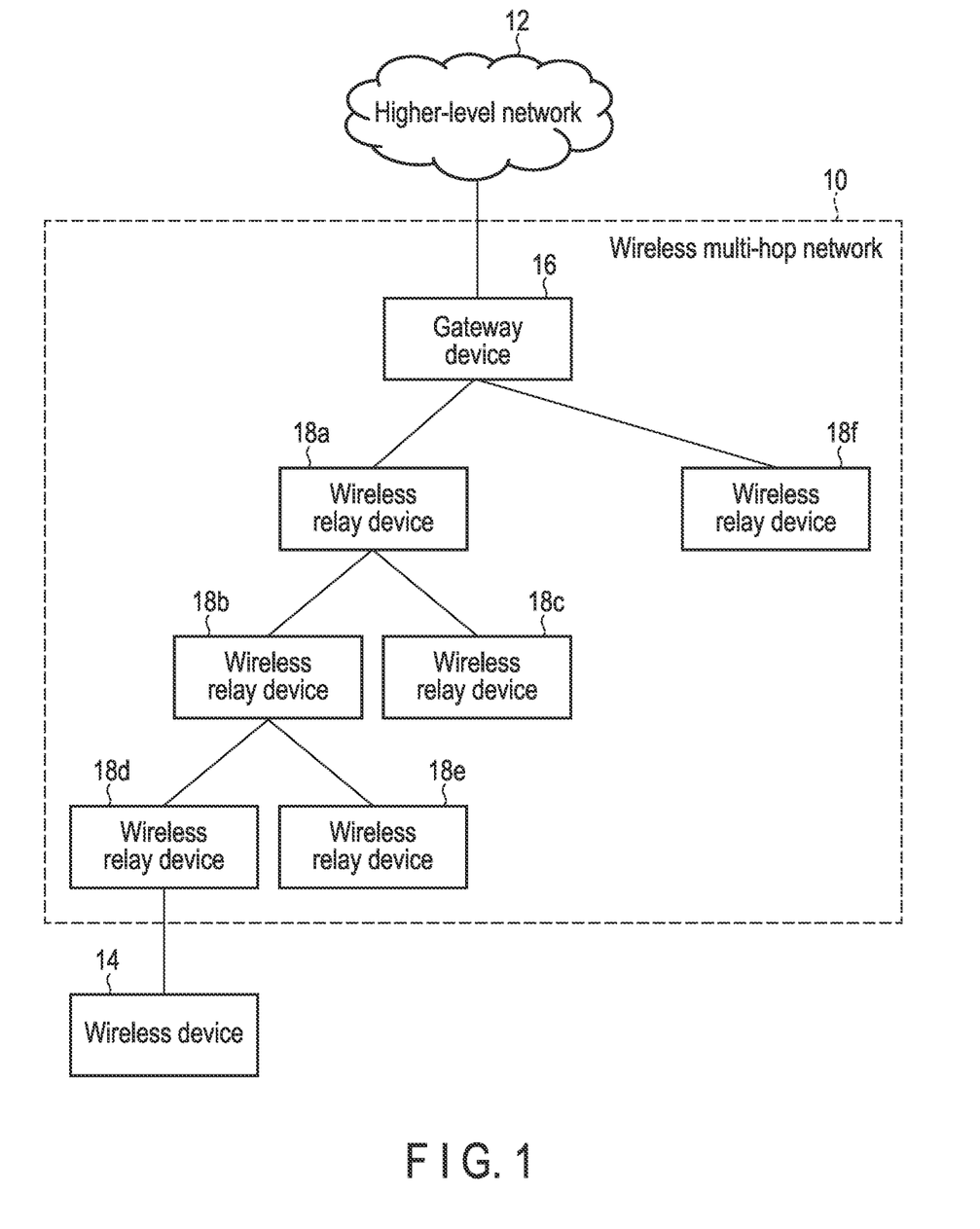
FIG. 1 is a block diagram illustrating an example of a communication network including a wireless multi-hop network according to an embodiment.

FIG. 1 is a block diagram illustrating an example of a communication network including a wireless multi-hop network 10 according to the embodiment. FIG. 1 illustrates a configuration of the wireless multi-hop network 10 at a certain timing. A wireless device 14 is connected to the wireless multi-hop network 10. A plurality of wireless devices 14 may be connected to the wireless multi-hop network 10. The wireless multi-hop network 10 is connected to a higher-level network 12.

The wireless multi-hop network 10 includes at least one gateway device 16 (FIG. 1 shows one gateway device) and at least one wireless relay device (here, six wireless relay devices 18a, 18b, 18c, 18d, 18e, and 18f). Each of the wireless relay devices 18*a* to 18*f* is referred to as the wireless relay device 18 when there is no need to distinguish from each other. The wireless relay device 18 is connected to the gateway device 16 directly or indirectly via the other wireless relay device 18. The wireless device 14 is connected to any one of the wireless relay devices 18*a* to 18*f*.

The gateway device 16 and the wireless relay device 18 basically have the same wireless communication function, and thus, may be referred to as wireless relay devices. The gateway device 16 is different from the wireless relay device 18 in terms of having a communication function with the higher-level network 12.

The gateway device 16 is connected to the higher-level network 12. The connection between the gateway device 16 and the higher-level network 12 may be a wired connection via a communication line or a wireless connection via a wireless network.

The gateway device 16 and the wireless relay device 18 cooperatively execute a routing protocol to generate a transmission route of the wireless multi-hop network 10. Such a multi-stage relay transmission route may be created using, for example, RPL, IEEE 802.11s, or other routing protocols. Examples of the other routing protocols are routing protocols of an Internet Protocol (IP) layer and a Media Access Control (MAC) layer. When such a multi-stage relay transmission route is created, a packet can be transmitted and received between the wireless device 14 and the wireless relay device 18, between the plurality of wireless relay devices 18*a* to 18*f*, and between the wireless relay device 18 and the gateway device 16.

The wireless multi-hop network. 10 can be applied to a wireless LAN compliant with the IEEE 802.11 standard, but can also be applied to other wireless networks. The wireless multi-hop network 10 can be implemented as a wireless LAN in a factory or a warehouse. In this case, the wireless relay device 18 may be fixed in a site or may be mounted on a robot such as an autonomous mobile robot (AMR), an automatic guided vehicle (AGV), and a manipulator.

Conventionally, if the wireless device 14 does not support a routing protocol, it is difficult to generate a transmission route of the wireless multi-hop network 10. According to the embodiment, the transmission route of the wireless multi-hop network 10 is created even if the wireless device 14 does not support the routing protocol. A description will be given regarding a procedure for incorporating the wireless device 14 into the wireless multi-hop network 10 and enabling the wireless device 14 and the gateway device 16 to transmit and receive a packet via the wireless multi-hop network 10 in a case where the wireless device 14 externally connected to the wireless multi-hop network 10 does not support the routing protocol. The case where the wireless device 14 does not support the routing protocol refers to a case where the wireless device 14 is not implemented with the routing protocol or a case where the wireless device 14 is implemented with the routing protocol but the function of the routing protocol is stopped.

Figure 2:
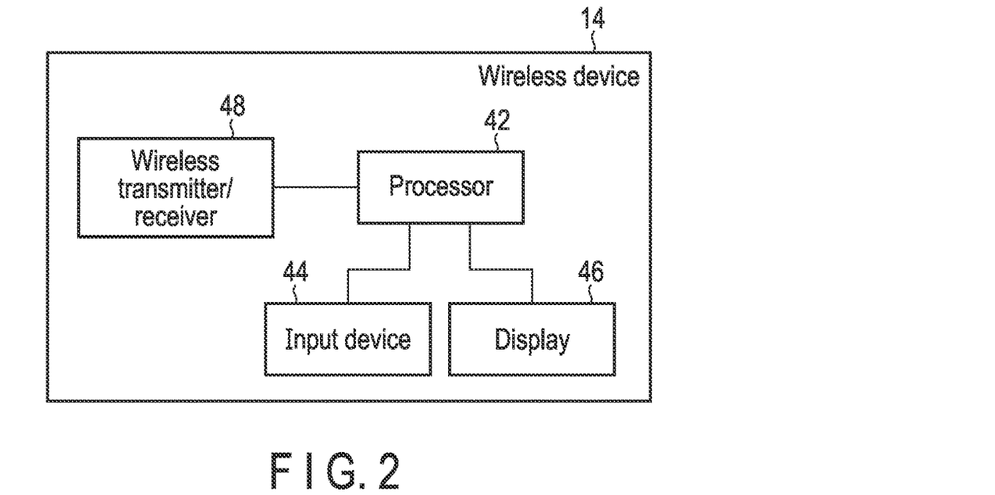
FIG. 2 is a block diagram illustrating an example of a wireless device according to the embodiment.

FIG. 2 is a block diagram illustrating an example of the wireless device 14 according to the embodiment. The wireless device 14 includes an input device 44, a display 46, a wireless transmitter/receiver 48, and a processor 42 that controls these devices. The processor 42 executes a program for controlling wireless communications. The program is stored in a memory (not shown). The input device 44 includes a keyboard and the like to input an instruction or data. The input device 44 and the display 46 may be integrated as a touch panel instead of being provided separately. Examples of the wireless device 14 include a smart-phone and a personal computer. The wireless device 14 transmits input data or input data processed by the processor 42 to the higher-level network 12 via the wireless multi-hop network 10. The wireless device 14 receives data received from the higher-level network 12 via the wireless multi-hop network 10.

Figure 3:
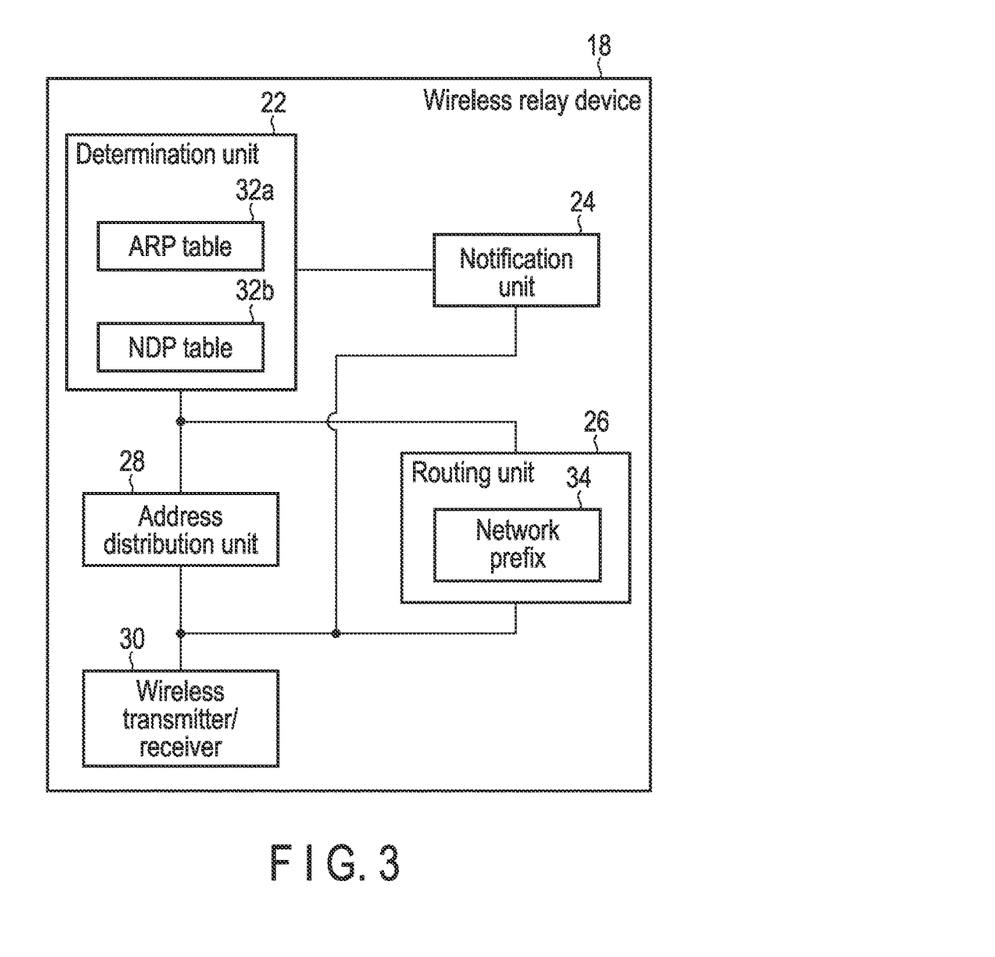
FIG. 3 is a block diagram illustrating an example of a wireless relay device according to the embodiment.
Figure 4:
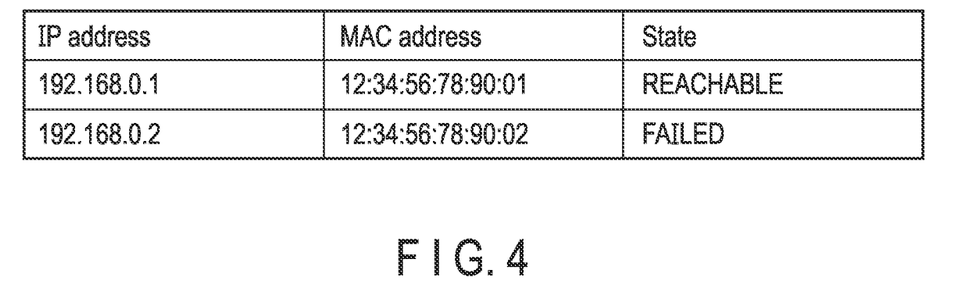
FIG. 4 is a diagram illustrating an example of an address resolution protocol (ARP) table according to the embodiment.
Figure 5:
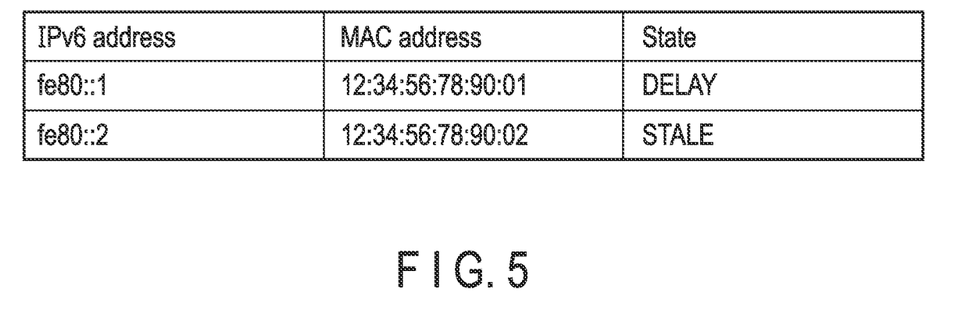
FIG. 5 is a diagram illustrating an example of a neighbor discovery protocol (NDP) table according to the embodiment.

FIG. 3 is a block diagram illustrating an example of the wireless relay device 18 according to the embodiment. The wireless relay device 18 includes a determination unit 22, a notification unit 24, a routing unit 26, an address distribution unit 28, and a wireless transmitter/receiver 30. The determination unit 22 is connected to the notification unit 24, routing unit 26, and address distribution unit 28. The wireless transmitter/receiver 30 is connected to the notification unit 24, routing unit 26, and address distribution unit 28. The determination unit 22 stores an ARP table 32*a* and an NDP table 32*b*. Details of the ARP table 32*a* and NDP table 32*b* are illustrated in FIGS. 4 and 5. The routing unit 26 stores a network prefix 34 of the wireless relay device 18. The network prefix 34 of the wireless relay device 18 is different from a network prefix of the wireless multi-hop network 10.

When detecting that the wireless device 14 is connected, the wireless relay device 18 connects a wireless link with the wireless device 14 using a MAC protocol to enable transmission and reception of a data frame to and from the wireless device 14. The MAC protocol is, for example, an association protocol defined by IEEE 802.11.

The determination unit 22 detects chat the wireless device 14 is connected to the wireless relay device 18. The determination unit 22 may detect the connection of the wireless device 14 by monitoring the frame received by the MAC protocol, or by monitoring a state of the wireless device 14 managed by the wireless relay device 18. Examples of the state of the wireless device 14 include an association state of the MAC protocol, a state of cache information of an ARP that resolves an IP address, and a state of cache information of an NDP that resolves an IPV6 address. For this monitoring, the determination unit 22 stores the ARP table 32*a* and the NDP table 32*b*.

At least one of the determination unit 22, notification unit 24, routing unit 26, address distribution unit 28, and wireless transmitter/receiver 30 may be implemented by a processor or processors. The processor executes a program for controlling the wireless relay device 18. The program is stored in a memory (not shown).

FIG. 4 is a diagram illustrating an example of the ARP table 32*a* according to the embodiment. The ARP table 32*a* is indicative of a correspondence relationship between a MAC address and an IP address, and the state of the wireless device 14. The MAC address is obtained by the determination unit 22 from the IP address of the wireless device 14 using the ARP. A state "reachable" indicates a reachable state, that is, a connected state, and a state "failed" indicates a connection failure.

FIG. 5 is a diagram illustrating an example of the NDP table 32*b* according to the embodiment. The NDP table 32*b* is indicative of a correspondence relationship between a MAC address and an IPV6 address, and the state of the wireless device 14. The MAC address is obtained by the determination unit 22 from the IPV6 address of the wireless device 14 using the NDP. A state "delay" and a state "stale" are states in which a predetermined time has elapsed since the state "reachable" and it is difficult to know whether connection is possible. The state "delay" is a standby state until confirmation by the NDP. The state "stale" is a state in which confirmation is not performed until a new packet is transmitted.

In order to detect the connection of the wireless device 14 by monitoring the ARP table 32a and NDP table 32b, first, the address distribution unit 28 sets an IP address or an IPv6 address of the wireless relay device 18 (referred to as an IP address when there is no need to distinguish between the both) in the wireless device 14 to enable packet transmission between the wireless device 14 and the wireless relay device 18. As a method of setting the address, network prefix information and an IP address that needs to be set may be automatically distributed and set by a dynamic host configuration protocol (DHCP) or a router advertisement (RA), or a predetermined valve may be manually set on the wireless device 14 side. When a destination MAC address is resolved using the ARP table 32a and the NDP table 32b for transmission of an IP packet or an IPV6 packet (referred to as an IP packet when there is no need to distinguish between the both), the determination unit 22 stores the MAC address into the ARP table 32a or NDP table 32b.

Whether the MAC address of the wireless device 14 is valid can be determined according to the states of the ARP table 32a and NDP table 32b. When the MAC address is valid, it is possible to detect the connection of the wireless device 14 corresponding to the MAC address.

Figure 6:
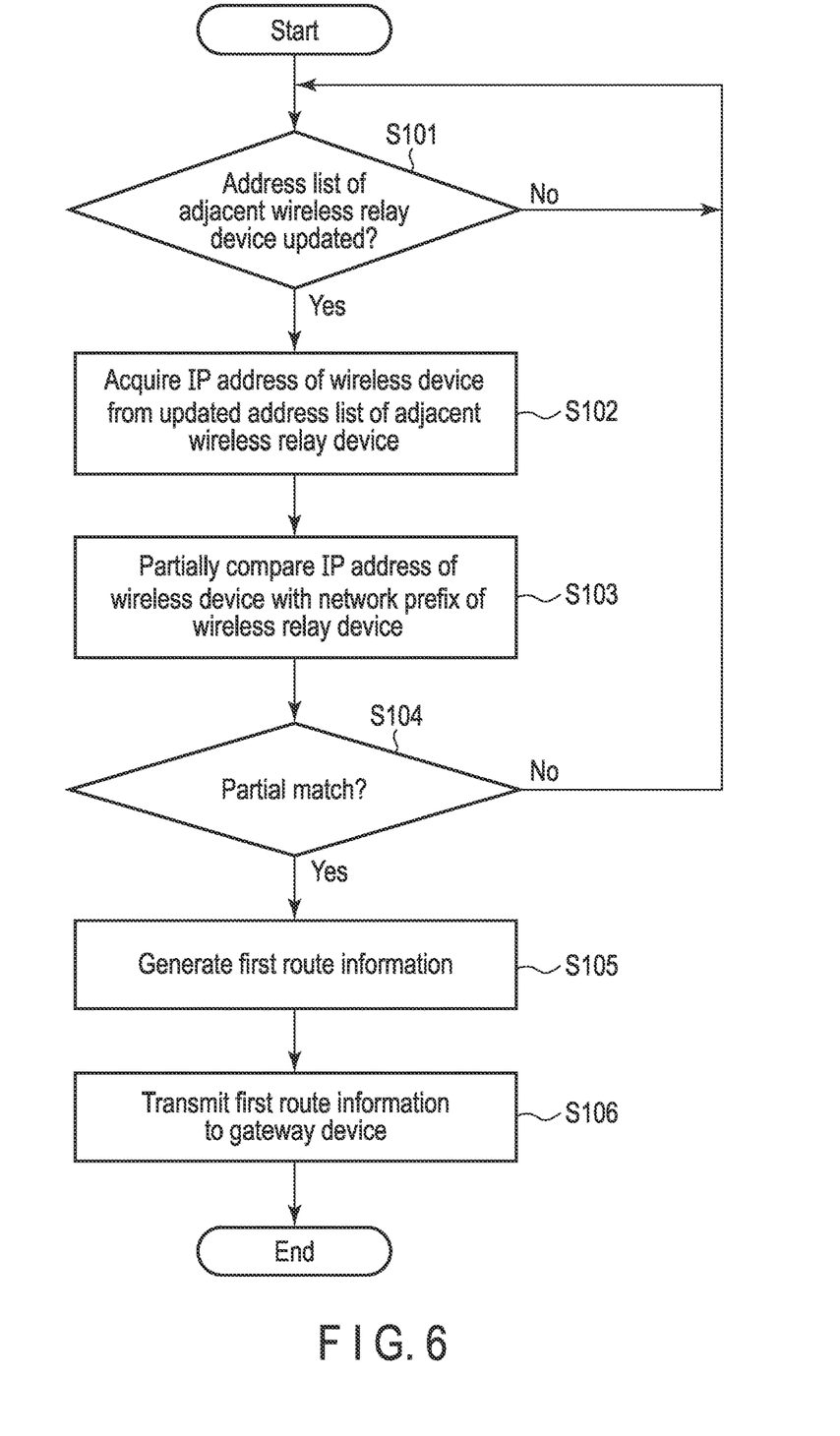
FIG. 6 is a flowchart illustrating an example of a route information generation process by the wireless relay device according to the embodiment.

FIG. 6 is a flowchart illustrating an example of a route information generation process of the wireless relay device 18 according to the embodiment.

In step S101, the determination unit 22 determines whether or not an address list of an adjacent wireless relay device 18 has been updated. The address list is the ARP table 32a or NDP table 32b. It can be determined that the address list has been updated when an IP address of the wireless device 14 is newly stored in the ARP table 32a or NDP table 32b, or when the state of the wireless device 14 in the ARP table 32a or NDP table 32b changes. When determined that the address list has been updated, the determination unit 22 determines that the wireless device 14 has been connected to (or participated in) the wireless multi-hop network 10, and executes the processing of step S102. The determination unit 22 repeatedly executes the determination in step S101 until determining that the address list has been updated.

In step S102, the determination unit 22 acquires the newly stored or updated IP address of the wireless device 14 from the updated address list of the adjacent wireless relay device 18.

In step S103, the determination unit 22 partially compares the IP address of the wireless device 14 acquired in step S102 with the network prefix 34 of the wireless relay device 18 stored in the routing unit 26. The IP address is information obtained by combining the network prefix and a node address. The determination unit 22 determines that there is a partial match when the network prefix having a certain length from the start of the IP address matches the network prefix 34.

In step S104, the determination unit 22 determines whether or not the comparison result in step S103 is a partial match. As described above, the network prefix 34 of the wireless relay device 18 stored in the routing unit 26 is different from the network prefix of the wireless multi-hop network 10. Therefore, when a higher bit of the IP address of the wireless device 14 matches the network prefix 34 stored in the routing unit 26, it can be considered that the wireless device 14 does not participate in the wireless multi-hop network 10. No participation means that the wireless device 14 does not support the routing protocol implemented with the wireless relay device 18, or a function of the routing protocol is stopped even if the routing protocol is implemented with the wireless device. When the determination unit 22 determines in step S104 that there is a partial match between the IP address of the wireless device 14 and the network prefix 34, the processing of step S105 is executed. When determining in step S104 that there is no partial match between the IP address and the network prefix 34, the determination unit 22 executes the determination processing of step S101 again.

Figure 7:
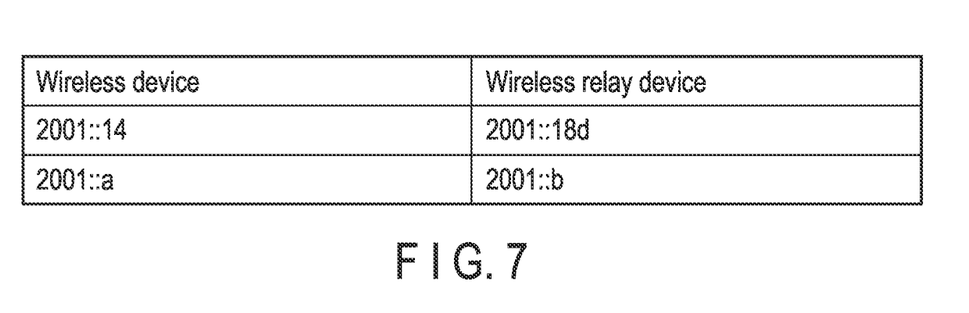
FIG. 7 is a drawing illustrating an example of first route information according to the embodiment.

In step S105, the notification unit 24 generates first route information. FIG. 7 is a diagram illustrating an example of the first route information according to the embodiment. The first route information is route information between the wireless device 14 and the wireless relay device 18 (here, 18d). The first route information is a pair of IP addresses associating the IP address of the wireless device 14 with the IP address of the wireless relay device 18d. FIG. 7 illustrates an example in which two wireless devices 14 are connected to two wireless relay devices 18, respectively. Note that the first route information may be created using other addresses or identifiers of the wireless device 14 and the wireless relay device 18, instead of the IP address.

In step S106, the wireless transmitter/receiver 30 transmits the first route information as a packet to the gateway device 16. The gateway device 16 and the wireless relay device 18 construct the wireless multi-hop network 10, and packets of the both are reachable. In the transmission, the wireless transmitter/receiver 30 can use a transport protocol such as a TCP and a UDP.

As described above, when the wireless relay device 18 detects that the wireless device 14 is connected to itself in step S101, the wireless relay device 18 can transmit the first route information to the gateway device 16 via another wireless relay device 18 or directly to the gateway device 16 in steps S102 to S106. The first route information is route information between the wireless relay device 18 and the wireless device 14, which is the pair of the IP address as the identifier of the wireless relay device 18 and the IP address as the identifier of the wireless device 14. When receiving the first route information, the gateway device 16 can construct the multi-stage relay transmission route from the gateway device 16 to the wireless device 14 in combination with second route information which is route information between the wireless relay devices 18 of the wireless multi-hop network 10 stored in advance.

Figure 8:
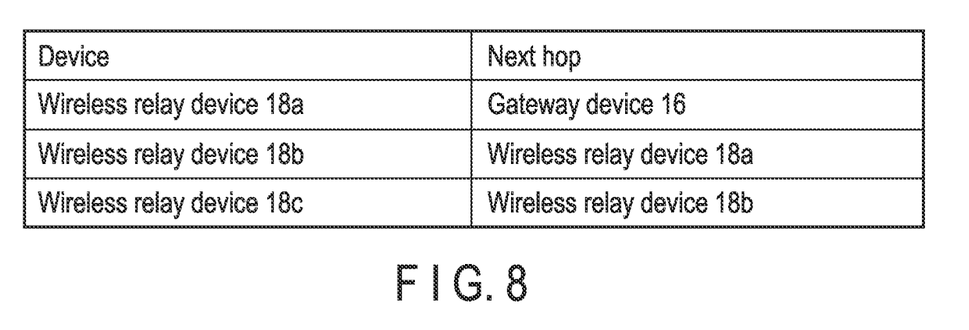
FIG. 8 is a drawing illustrating an example of second route information according to the embodiment.

FIG. 8 is a diagram illustrating an example of the second route information according to the embodiment.

Figure 9:
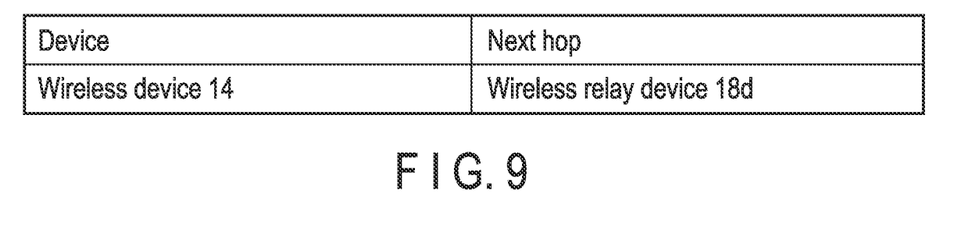
FIG. 9 is a drawing illustrating an example of the first route information transmitted from the wireless relay device to a gateway device according to the embodiment.

FIG. 9 is a diagram illustrating an example of the first route information according to the embodiment, transmitted from the wireless relay device 18 to the gateway device 16 in step S106.

Figure 10:
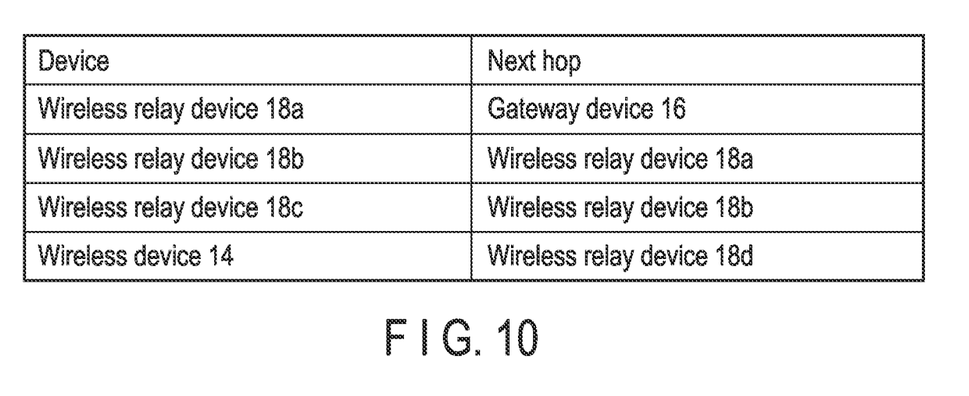
FIG. 10 is a drawing illustrating an example of route information from the gateway device to the wireless device generated by the gateway device according to the embodiment.

FIG. 10 is a diagram illustrating an example of route information on the transmission route from the gateway device 16 to the wireless device 14 created from the first route information and the second route information by the gateway device 16 according to the embodiment.

Figure 11:
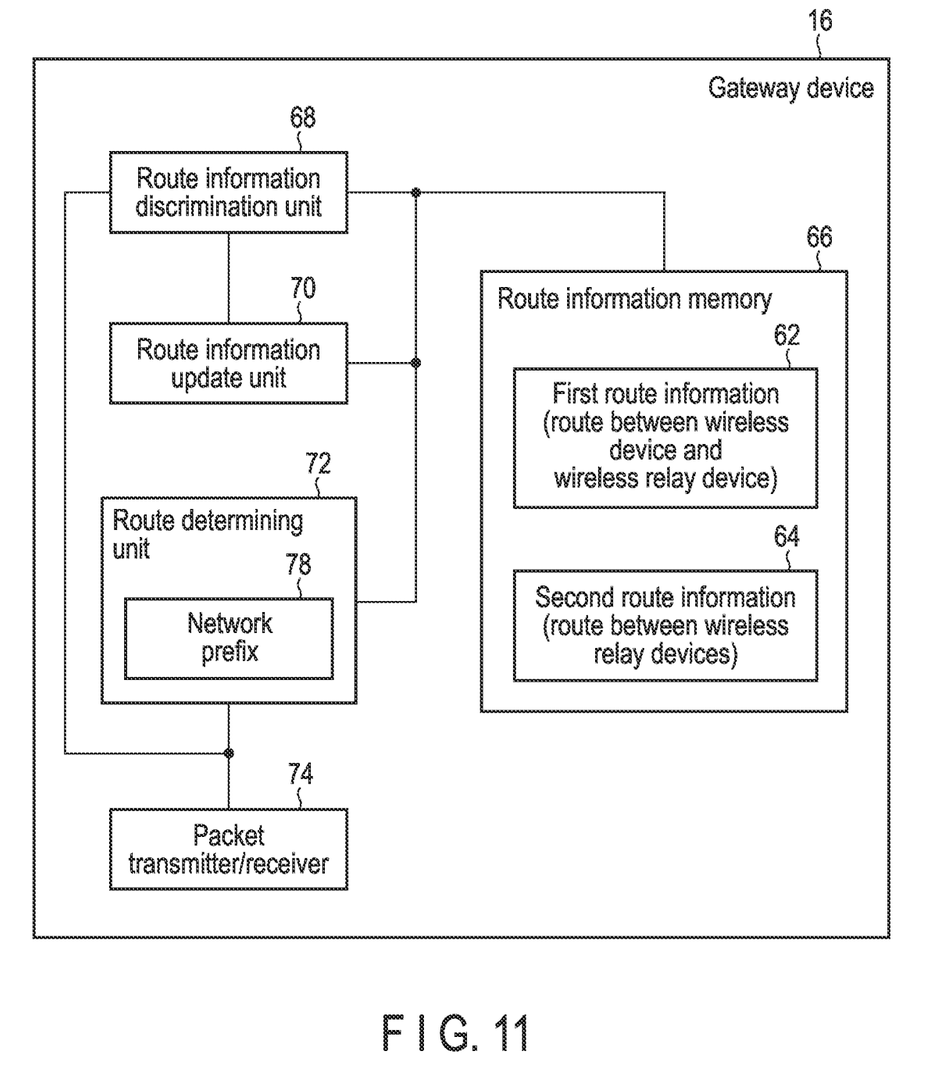
FIG. 11 is a block drawing illustrating an example of the gateway device according to the embodiment.

Next, a method of creating the route information of the gateway device 16 will be described. FIG. 11 is a block diagram illustrating an example of the gateway device 16 according to the embodiment. The gateway device 16 includes a route information memory 66, a route information discrimination unit 68, a route information update unit 70, a route determining unit 72, and a packet transmitter/receiver 74. The route information memory 66 stores first route information 62 between the wireless device 14 and the wireless relay device 18 and second route information 64 between the wireless relay devices 18 of the wireless multi-hop network 10 in different formats. The format corresponds to a list and a table of information in which two addresses are paired as illustrated in FIGS. 7, 8, 9, and 10. The route determining unit 72 stores network prefixes 78 in IP addresses of all the wireless relay devices 18 in the wireless multi-hop network 10. The first route information is not necessarily stored in the route information memory 66, and the first route information may be stored in the wireless relay device 18.

At least one of the route information memory 66, route information discrimination unit 68, route information update unit 70, route determining unit 72, and packet transmitter/receiver 74 may be implemented by a processor or processors. The processor executes a program for controlling the gateway device 16. The program is stored in a memory (not shown).

Figure 12:
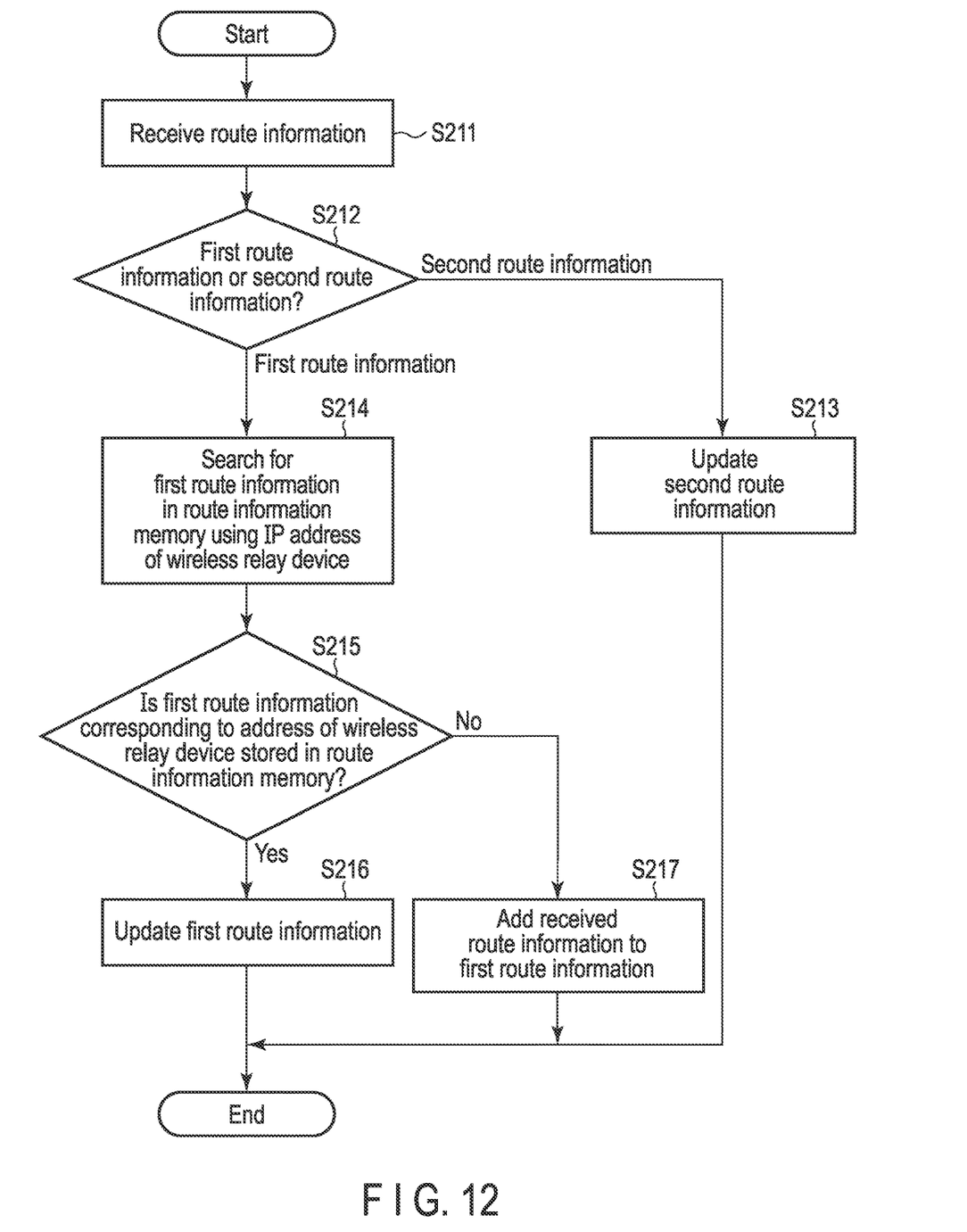
FIG. 12 is a flowchart illustrating an example of a route information reception process by the gateway device according to the embodiment.

FIG. 12 is a flowchart illustrating an example of a route information reception process of the gateway device 16 according to the embodiment.

In step S211, the packet transmitter/receiver 74 receives a route information packet transmitted from the wireless relay device 18.

In step S212, the route information discrimination unit 68 discriminates whether the route information received by the packet transmitter/receiver 74 is the first route information between the wireless device 14 and the wireless relay device 18 or the second route information between the wireless relay devices 18. The wireless relay device 18 transmits the second route information to the gateway device 16 when a route in the wireless multi-hop network 10 is constructed or reconstructed. Therefore, the second route information is updated by the wireless relay device 18 at any timing and transmitted to the gateway device 16.

The second route information is transmitted according to the routing protocol of the wireless multi-hop network 10, and thus, can be discriminated. The first route information is transmitted using a transport protocol such as a TCP and a UDP, and thus, can be discriminated by defining a message format to be used or a port number of the transport protocol in advance.

When the received route information is the second route information, the route information update unit 70 updates the second route information 64 stored in the route information memory 66 in step S213.

Figure 13:
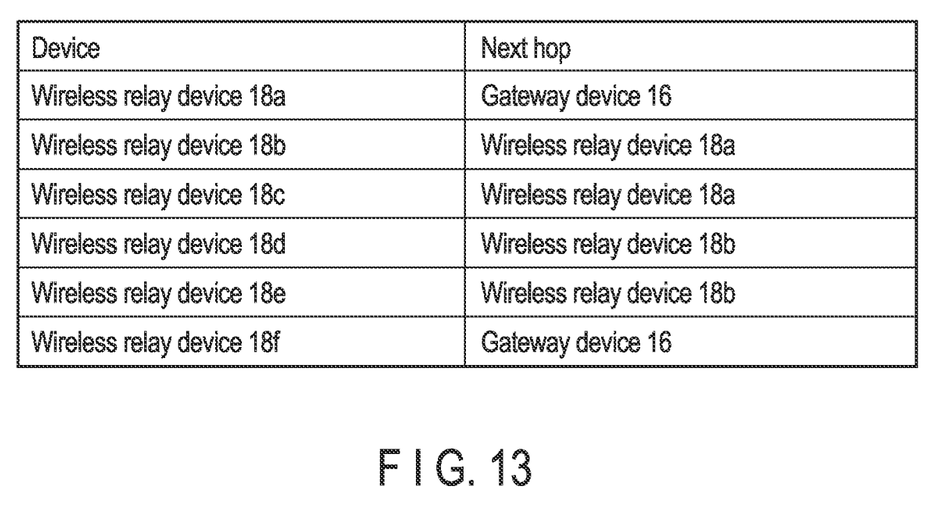
FIG. 13 is a diagram illustrating an example of the second route information which is not updated and is stored in a route information memory according to the embodiment.

FIG. 13 is a diagram illustrating an example of the second route information 64 before the update stored in the route information memory 66 according to the embodiment.

Figure 14:
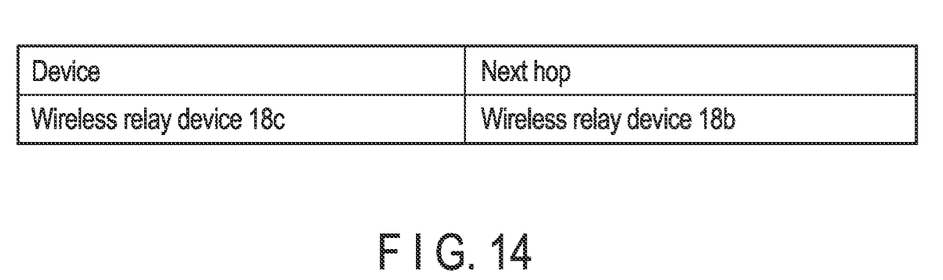
FIG. 14 is a drawing illustrating an example of the second route information received by the gateway device according to the embodiment.

FIG. 14 is a diagram illustrating an example of the second route information received by the gateway device 16 according to the embodiment in step S211.

Figure 15:
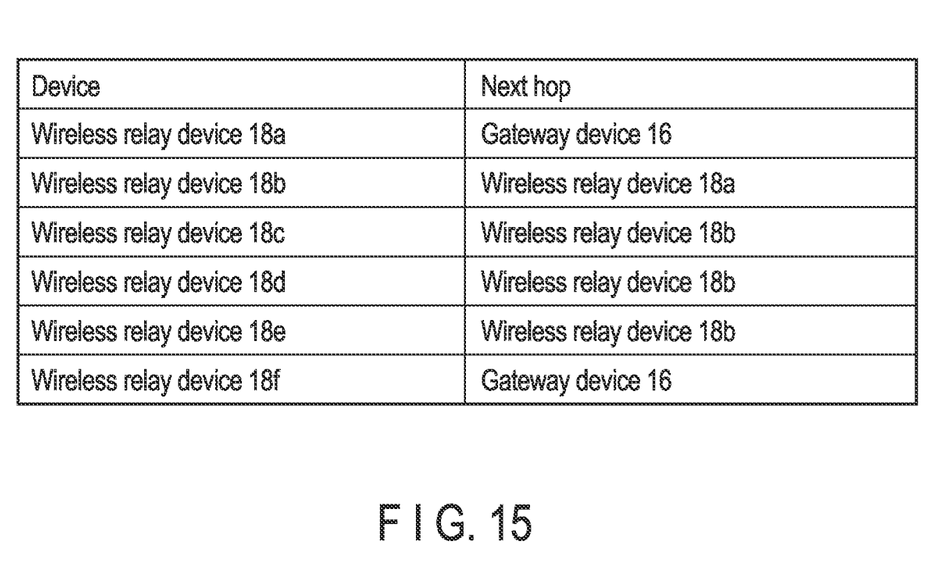
FIG. 15 is a diagram illustrating an example of the second route information which is updated according to the embodiment.

FIG. 15 is a diagram illustrating an example of the second route information 64 updated in step S213. Before the update, the next hop of the wireless relay device 18c is the wireless relay device 18a as illustrated in FIG. 1. However, the next hop of the wireless relay device 18c is changed to the wireless relay device 18b by the update of the wireless multi-hop network 10.

When the received route information is the first route information, the route information update unit 70 searches for a wireless relay device of the first route information 62 stored in the route information memory 66 using an IP address of the wireless relay device described in the received route information in step S214.

As a result of the search in step S214, the route information update unit 70 determines in step S215 whether the route information memory 66 stores the first route information 62 having an address corresponding to an address of the wireless relay device described in the received route information.

When the route information memory 66 stores the first route information 62 having the address corresponding to the address of the wireless relay device described in the received route information, the route information update unit 70 updates the first route information 62 stored in the route information memory 66 in step S216. An example of the update is a case where a connection destination of the wireless device 14 is changed from the wireless relay device 18d to another wireless relay device 18.

When the route information memory 66 does not store the first route information 62 having the address corresponding to the address of the wireless relay device described in the received route information, the route information update unit 70 adds the received route information to the first route information 62 stored in the route information memory 66 in step S217.

Figure 16:
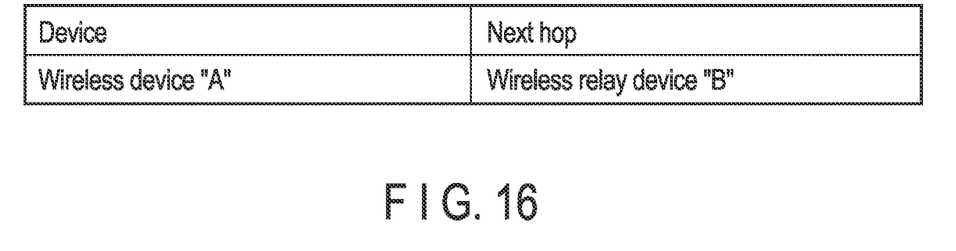
FIG. 16 is a diagram illustrating an example of the first route information stored in the route information memory according to the embodiment.

FIG. 16 is a diagram illustrating an example of the first route information 62 stored in the route information memory 66 according to the embodiment.

Figure 17:
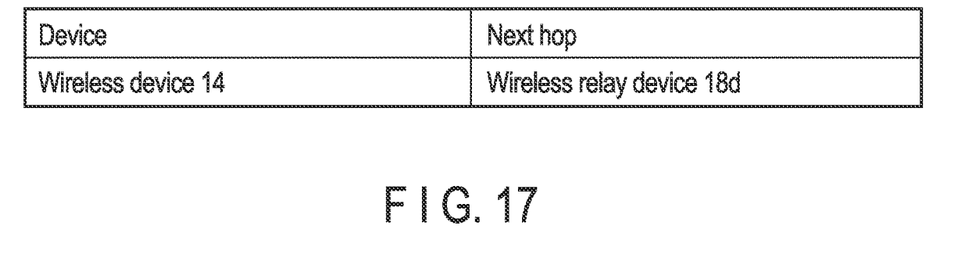
FIG. 17 is a diagram illustrating an example of the first route information received by a packet transmitter/receiver according to the embodiment.

FIG. 17 is a diagram illustrating an example of the first route information received in step S211 by the packet transmitter/receiver 74 according to the embodiment.

Figure 18:
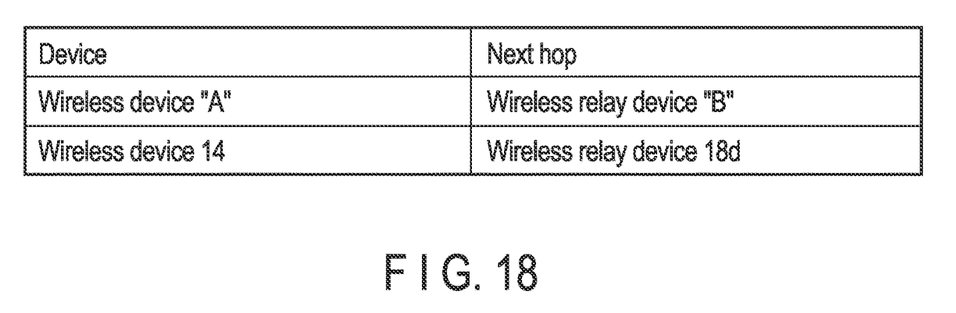
FIG. 18 is a diagram illustrating an example of the first route information which is stored in the route information memory after an addition process according to the embodiment.

FIG. 18 illustrates an example of the first route information 62 stored in the route information memory 66 according to the embodiment after the addition processing of step S217. Before the addition, a wireless device "A" is connected to a wireless relay device "B". When the wireless device 14 is connected to the wireless relay device 18d as illustrated in FIG. 1, the first route information between the wireless device 14 and the wireless relay device 18 stored in the route information memory 66 is changed as illustrated in FIG. 18.

As described above, the gateway device 16 stores the first route information 62 and the second route information 64, and updates the stored first route information 62 or second route information 64 with the first route information or second route information received from the wireless relay device 18, so that a packet relay route from the wireless device 14 to the gateway device 16 can be updated when the wireless device 14 changes the wireless relay device 18 as the connection destination.

Figure 19:
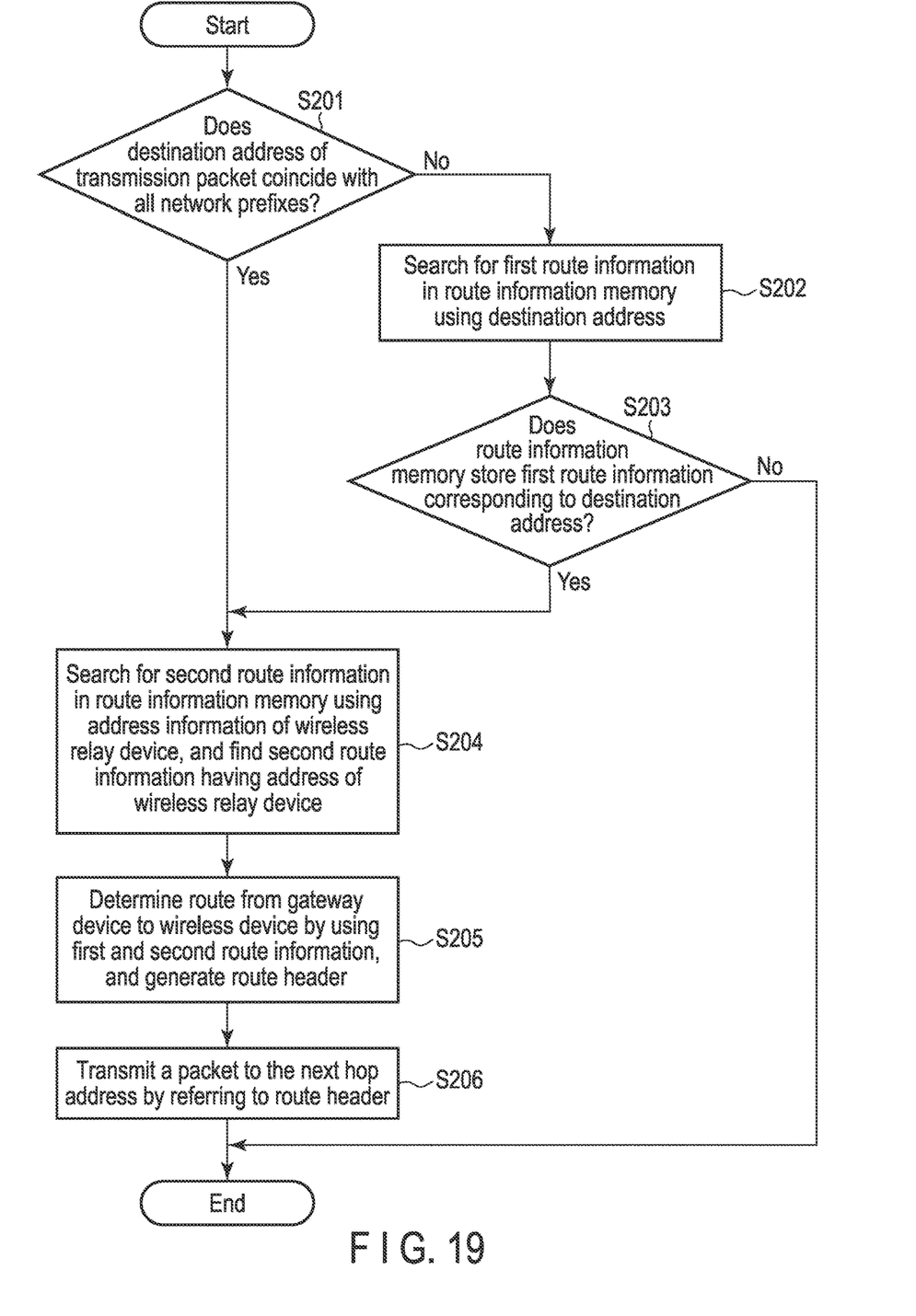
FIG. 19 is a flowchart illustrating an example of a packet transmission process by the gateway device according to the embodiment.

FIG. 19 is a flowchart illustrating an example of a packet transmission method of the gateway device 16 according to the embodiment.

In step S201, first, the route determining unit 72 compares a destination address of a transmission packet with all the network prefixes 78 stored therein. The route determining unit 72 executes the processing of step S204 when determining that the destination address matches any of the network prefixes 78, and executes the processing of step S202 when determining that there is no match.

In step S202, the route determining unit 72 searches for the first route information 62 stored in the route information memory 66 using the destination address.

After the search in step S202, the route determining unit 72 determines in step S203 whether the route information memory 66 stores the first route information 62 having an address corresponding to the destination address.

When determining chat the route information memory 66 does not store the first route information 62 having the address corresponding to the destination address, the packet cannot be transmitted to the destination address, and thus, the process ends.

When determining that the route information memory 66 stores the first route information 62 having the address corresponding to the destination address, the route determining unit 72 searches for the second route information 64 stored in the route information memory 66 using address information of a wireless relay device 18 included in this first route information 62, and finds the second route information 64 having an address of the wireless relay device 18 included in the first route information 62 in step S204.

Figure 20:
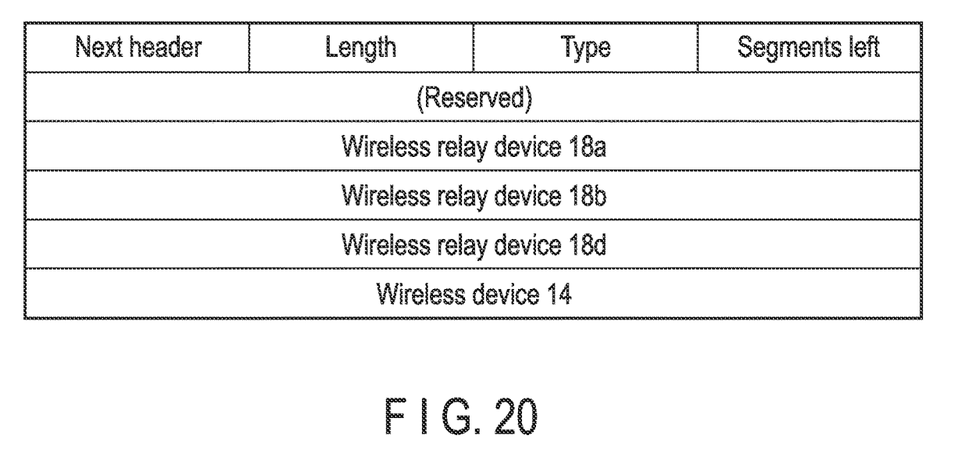
FIG. 20 is a diagram illustrating an example of a header of the route information according to the embodiment.

In step S205, the packet transmitter/receiver 74 determines a route from the gateway device 16 to the wireless device 14 by using the first route information between the wireless device 14 and the wireless relay device 18 obtained in step S203 and the second route information of the wireless multi-hop network 10 obtained in step S204, and generates a route header. The route header can be created, for example, according to a format described in IPV6 (RFC2460). FIG. 20 is a diagram illustrating an example of the route header according to the embodiment.

In step S206, the packet transmitter/receiver 74 refers to the route header and transmits a packet to the next hop address (here, the wireless relay device 18a).

In this manner, the gateway device 16 combines the first route information and second information to search for a route to a destination address. Thus, even when the wireless device 14 that does not support the routing protocol is connected to the wireless relay device 18 in the wireless multi-hop network 10, it is possible to correctly search for the route from the gateway device 16 to the wireless device 14 and to transmit a transmission packet addressed to the wireless device 14.

As illustrated in step S101 of FIG. 6, the determination unit 22 of the wireless relay device 18 determines that the wireless device 14 has been connected to the wireless multi-hop network 10 based on whether or not the address list of the adjacent wireless relay device 18 is updated. As another example in which the wireless relay device 18 detects the connection of the wireless device 14, there is a method of using the Internet Control Message Protocol (ICMP). The wireless relay device 18 periodically transmits an ICMP echo request packet addressed to a broadcast address corresponding to a network address distributed by the wireless relay device 18. When the wireless device 14 is connected to the wireless relay device 18, the wireless device 14 transmits an ICMP echo response packet. Thus, when the wireless relay device 18 can receive a frame including the ICMP echo response packet, it can be determined that the wireless device 14 is connected to the wireless relay device 18.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless relay device in a multi-hop network including at least a gateway device, the wireless relay device comprising:
    a determination unit configured to determine whether a wireless device connected to the wireless relay device supports a routing protocol of the multi-hop network;
    a notification unit configured to notify the gateway device or another wireless relay device in the multi-hop network of information for identifying the wireless device when the determination unit determines that the wireless device does not support the routing protocol; and
    a distribution unit configured to distribute a network address of the wireless relay device to the wireless device,
    wherein the determination unit is configured to determine whether the wireless device supports the routing protocol based on a comparison between the network address and an address of the wireless device.

2. The wireless relay device according to claim 1, wherein the determination unit is configured to detect that the wireless device is connected to the wireless relay device based on state information of the wireless device stored in an address resolution table.

3. The wireless relay device according to claim 1, wherein the determination unit is configured to detect that the wireless device is connected to the wireless relay device when receiving a frame on a wireless link with the wireless device.

4. The wireless relay device according to claim 1, further comprising a routing unit configured to execute a routing protocol of an Internet Protocol layer and perform routing of the multi-hop network.

5. The wireless relay device according to claim 4, wherein the routing protocol of the Internet Protocol layer is IPV6 Routing Protocol for Low-power and Lossy Networks.

6. The wireless relay device according to claim 1, wherein the notification unit is configured to notify the gateway device or the other wireless relay device of information for identifying the wireless relay device with the information for identifying the wireless device.

7. The wireless relay device according to claim 1, wherein the multi-hop network is a local area network of a factory or a warehouse.

8. The wireless relay device according to claim 7, wherein the wireless relay device is attached to a position inside the factory or the warehouse, or is attached to a robot that moves inside the factory or the warehouse.

9. A multi-hop network system comprising:
    wireless relay devices;
    a distribution unit; and
    a gateway device,
    wherein each of the wireless relay devices comprises:
        a determination unit configured to determine whether a wireless device connected to the wireless relay device supports a routing protocol of the multi-hop network; and
        a notification unit configured to notify the gateway device or another wireless relay device in the multi-hop network of information for identifying the wireless device when it is determined that the wireless device does not support the routing protocol,
    wherein the gateway device comprises:
        a memory configured to store first route information between a wireless device connected to a first wireless relay device among the wireless relay devices and the first wireless relay device, and second route information of the multi-hop network;
        a receiver configured to receive route information from a second wireless relay device among the wireless relay devices;
        a second determination unit configured to determine whether the received route information is the first route information or the second route information; and
        a route changing unit configured to change the first route information or the second route information based on a result of a determination as to whether the received route information is the first route information or the second route information, wherein the distribution unit is configured to distribute a network address of the wireless relay device to the wireless device, and wherein the determination unit is configured to determine whether the wireless device supports the routing protocol based on a comparison between the network address and an address of the wireless device.

10. The multi-hop network system according to claim 9, wherein the determination unit is configured to detect that the wireless device is connected to the wireless relay device based on state information of the wireless device stored in an address resolution table.

11. The multi-hop network system according to claim 9, wherein the determination unit is configured to detect that the wireless device is connected to the wireless relay device when receiving a frame on a wireless link with the wireless device.

12. The multi-hop network system according to claim 9, further comprising a routing unit configured to execute a routing protocol of an Internet Protocol layer and perform routing of the multi-hop network.

13. The multi-hop network system according to claim 9, wherein the routing protocol of the Internet Protocol layer is IPV6 Routing Protocol for Low-power and Lossy Networks.

14. The multi-hop network system according to claim 9, wherein the notification unit is configured to notify the gateway device or the other wireless relay device of information for identifying the wireless relay device with the information for identifying the wireless device.

15. The multi-hop network system according to claim 9, wherein the multi-hop network is a local area network of a factory or a warehouse.

16. The multi-hop network system according to claim 9, further comprising:

a route determining unit configured to search for the second route information using information for identifying a transmission destination and determine a route; and a packet transmitter configured to transmit a transmission packet based on the route.

* * * * *